United States Patent
Wise et al.

(10) Patent No.: US 9,114,537 B2
(45) Date of Patent: Aug. 25, 2015

(54) TOOLING SYSTEM WITH ELECTRONIC SIGNAL MAINTENANCE

(71) Applicant: Apex Brands, Inc., Sparks, MD (US)

(72) Inventors: David Wise, Lexington, SC (US); Manfred Kogel, Baden Württemberg (DE); Klaus Wohlfarth, Baden Württemberg (DE); Peter Wiedenhöfer, Baden Württemberg (DE); Ulrich Kaminski, Baden Württemberg (DE); Martin Douglas Rola, Lexington, SC (US)

(73) Assignee: Apex Brands, Inc., Sparks, MD (US)

( * ) Notice: Subject to any disclaimer, the term of this patent is extended or adjusted under 35 U.S.C. 154(b) by 114 days.

(21) Appl. No.: 14/068,664

(22) Filed: Oct. 31, 2013

(65) Prior Publication Data

US 2015/0120041 A1     Apr. 30, 2015

(51) Int. Cl.
  *G01B 5/004*   (2006.01)
  *B23P 11/00*   (2006.01)
  *B23P 21/00*   (2006.01)
  *B25J 19/00*   (2006.01)

(52) U.S. Cl.
  CPC ........... *B25J 19/0025* (2013.01); *Y10S 901/23* (2013.01); *Y10S 901/25* (2013.01); *Y10S 901/41* (2013.01)

(58) Field of Classification Search
  USPC .............. 700/245, 247; 74/490.02, 490.01, 74/490.07, 490.11; 483/14, 58, 15; 29/705; 318/568.11, 568.2; 900/30, 41
  See application file for complete search history.

(56) References Cited

U.S. PATENT DOCUMENTS

| | | | | |
|---|---|---|---|---|
| 4,396,987 A | * | 8/1983 | Inaba et al. | 700/249 |
| 4,596,066 A | * | 6/1986 | Inoue | 483/4 |
| 4,621,398 A | * | 11/1986 | Kleiman | 29/264 |
| 5,008,832 A | * | 4/1991 | Torii et al. | 700/254 |
| 5,742,022 A | * | 4/1998 | Crawford et al. | 219/86.25 |
| 6,330,492 B1 | | 12/2001 | Wisniewski et al. | |
| 6,842,666 B2 | | 1/2005 | Katsuta | |
| 7,090,031 B2 | | 8/2006 | Kaminski | |
| 7,374,524 B2 | | 5/2008 | McCormick | |
| 7,681,311 B2 | | 3/2010 | Kaminski | |
| 7,979,162 B2 | | 7/2011 | Niemela et al. | |
| 8,418,341 B1 | * | 4/2013 | Fisher | 29/443 |
| 2004/0028507 A1 | | 2/2004 | Massaro | |
| 2005/0166413 A1 | * | 8/2005 | Crampton | 33/503 |
| 2005/0244260 A1 | | 11/2005 | Deplano | |
| 2006/0175439 A1 | | 8/2006 | Steur et al. | |

(Continued)

OTHER PUBLICATIONS

"Durable Production Performance" Tool product catalog, 10 pages. 2012. Apex Tool Group, LLC, Apex, NC.

*Primary Examiner* — Ronnie Mancho
(74) *Attorney, Agent, or Firm* — Coats & Bennett, P.L.L.C.

(57) ABSTRACT

Devices and methods for providing power to tools when the tools are not attached to a robotic device. The power source may be an energy storage device that is attached to a tool frame of a tool cluster. The power provides for the tools to be maintained in a ready state which expedites and/or eliminates the initiation process when the tools and the tool cluster are subsequently reattached to the robotic device. This reduces the time necessary for the tools to be used in the assembly process thereby increasing the efficiency of the tooling system.

29 Claims, 7 Drawing Sheets

(56) References Cited

U.S. PATENT DOCUMENTS

| | | | |
|---|---|---|---|
| 2007/0276538 A1* | 11/2007 | Kjellsson et al. | 700/245 |
| 2008/0046122 A1* | 2/2008 | Manzo et al. | 700/245 |
| 2008/0132393 A1* | 6/2008 | Jordil et al. | 483/58 |
| 2008/0220955 A1* | 9/2008 | Hesse et al. | 483/14 |
| 2009/0198370 A1* | 8/2009 | Nishi et al. | 700/184 |
| 2010/0197472 A1 | 8/2010 | Strotzer et al. | |
| 2011/0208353 A1 | 8/2011 | Kjellsson et al. | |
| 2012/0215348 A1* | 8/2012 | Skrinde | 700/245 |
| 2012/0277080 A1 | 11/2012 | Strotzer | |
| 2013/0116827 A1 | 5/2013 | Inazumi | |

* cited by examiner

TOOLING SYSTEM WITH ELECTRONIC SIGNAL MAINTENANCE

BACKGROUND

The present application is directed to a tooling system and method of providing power to one or more tools while they are not in use and, more particularly, to providing power to the tools after detachment from a robotic device.

Robotic devices are often used for performing various assembly operations in a manufacturing process. One example includes an assembly line for manufacturing automobiles. Multiple robotic devices are aligned along an assembly line along which the work pieces progress. Each robotic device is configured to use multiple tools for performing a variety of operations on the work pieces. This may include the robotic devices using a first set of one or more tools to perform a first set of operations on the work piece, and also using a second set of tools to perform additional operations on the work piece. The robotic devices are configured to attach and detach from the tool sets to perform the various operations.

Assembly lines are configured to perform a maximum amount of assembly work in a minimum amount of time. Therefore, the ability of the robotic devices to quickly change tool sets and for the tools to be responsive to the attachment/detachment to begin operations contributes to fast production times. Existing systems are often configured such that the changing of tool sets incurs time delays in the ability of the robotic devices to perform the various operations.

One particular delay is the time necessary for the tools to re-activate with the assembly system after they are reattached to the robotic device. This may occur when the tool set is not powered during detachment from the robotic device. When the tool set is reattached to the robotic device and receives power through the attachment, it is necessary for the tools to re-activate with the system. This reactivation process takes time during which the tools are non-operational and cannot be used in the assembly process. Only after the tools have been re-activated may they be used in the process. For an assembly system that may include numerous tool set changes per work piece, and may operate on numerous work pieces during a day, the accumulation of the delays becomes excessive and greatly decreases the efficiency of the system.

Therefore, there is a need for devices and methods to reduce the amount of time necessary to activate tools after being attached to a robotic device.

SUMMARY

The present application is directed to systems and methods of operating one or more tools in a manufacturing process. The tools are configured to perform an operation on a work piece. The tools are configured to receive power from a robotic device when the tool is attached to the robotic device. The tools are also configured to receive power from an alternate power source when the tools are detached from the robotic device.

One method is directed to providing power to one or more tools during a manufacturing process and includes attaching a tool cluster to a robotic device and providing power through the robotic device to each of a plurality of tools on the tool cluster. Operations are performed with the tools while the tool cluster is attached to and powered through the robotic device. A functional test is performed on the tools of the tool cluster while the tool cluster is attached to the robotic device and after performing the operations. The functional test determines whether the tool is operating according to predetermined criteria. The tool cluster is then detached from the robotic device. Power is provided to the tools through an alternate power source separate from the robotic device while the tool cluster is detached from the robotic device. The power source provides a lesser amount of voltage to the tools than the robotic device. This lesser voltage is adequate to maintain the tools in a functional ready state. The tool cluster is subsequently reattached to the robotic device and power is again provided to the tools through the robotic device. Operations are performed with the tools without again performing the functional test on the tools.

The method may also include receiving a signal to detach the tool cluster from the robotic device prior to performing the functional test on the tools.

The method may also include maintaining a processor in each of the tools active when the tool cluster is detached from the robotic device.

The method may include performing a tool verification and a signal verification procedure upon reattaching the tool cluster to the robotic device. Each of the tool verification and the signal verification take less time to complete than the functional test.

The method may include performing the functional test on each of the tools while the robotic device is moving the tool cluster towards a docking station.

The alternate power source may be a plurality of separate devices that each supply power to one or more of the tools.

The method may also include recharging the alternate power source through the robotic device while the tool cluster is attached to the robotic device.

The method may also include performing a functional test on the tools of the tool cluster while the tool cluster is detached from the robotic device with the functional test determining whether the tool is operating according to the predetermined criteria.

The method may also include providing power from the robotic device to a single one of the plurality of tools, and providing power to a remainder of the plurality of tools in a daisy-chain manner.

The method may include moving at least one of the tools from a working position to a retracted position in closer proximity to the robotic device while the tools are receiving power through the robotic device and prior to detaching the tool cluster from the robotic device.

Another embodiment is directed to a method of providing power to one or more tools during a manufacturing process. The method includes receiving power at a tool from the robotic device while the tool is attached to the robotic device. The method includes performing an operation with the tool while the tool is being powered through the robotic device. A signal is received indicating a detachment and then determining that the tool is in an operational condition. The tool is detached from the robotic device and power is received at the tool from an alternate power source. The amount of power received from the alternate power source is less than through the robotic device. The tool is reattached to the robotic device with the tool again receiving power through the robotic device. Operations are performed with the tool while reattached to the robotic device without determining that the tool is in the operational condition.

The method may also include maintaining a processor in the tool active when the tool is detached from the robotic device.

The method may also include performing a tool verification and a signal verification procedure upon reattaching the tool to the robotic device.

The method may include performing the functional test on the tool while the robotic device is moving the tool towards a docking station.

The tool may be mounted on a tool cluster with the tool cluster being configured to be attached and detached to the robotic device.

The method may also include supplying power to a second tool on the tool cluster through the robotic device when the tool cluster is attached to the robotic device and through the alternate power source when the tool cluster is detached from the power source.

The alternate power source may be a plurality of separate devices that each supply power to one or both of the tools.

The method may include performing a functional test on the tool while the tool cluster is detached from the robotic device with the functional test determining whether the tool is operating according to a predetermined criteria.

The method may include moving the tool from a working position to a retracted position in closer proximity to the robotic device after receiving the signal indicating the detachment, while the tool is receiving power through the robotic device, and prior to detaching the tool from the robotic device.

The method may include recharging the alternate power source through the robotic device while the tool is attached to the robotic device.

Another embodiment is directed to a tooling system that includes a frame configured to be removably attachable to a robotic device, and tools mounted to the frame and configured to perform an operation on a work piece. The tools each include a processor. Each of the tools is configured to receive a first amount of power from a first power source when the frame is attached to a robotic device, with the first power source providing power for the tools to perform operations on a first work piece, and to receive a lesser second amount of power from a second power source when the frame is detached from the robotic device. The processors are configured to perform a functional test on the tool after the operation on the work piece is complete and while receiving the first amount of power from the first power source. The functional test determines that the tool is operating according to a predetermined criteria. The processors are also configured to remain active and maintain the functional test while receiving the second lesser amount of power from the second power source. The processors are configured to perform the operation on a second work piece without performing the functional test on the tool when again receiving the first amount of power from the first power source.

The processors may be configured to perform a test on the tool while receiving the second lesser amount of power from the second power source with the test determining whether the tool is operating according to a predetermined criteria;

Each of the tools may be connected together in a daisy-chain manner with a first one of the plurality of tools configured to receive power from the first power source when the frame is attached to the robotic device and receive the second amount of power from the second power source when the frame is detached from the robotic device and a remainder of the plurality of tools connected together in the daisy-chain manner to receive the power.

The tools may further include a motor with the processor configured to position the motor at a predetermined setting during the functional test.

The frame may include a first connector to receive power from the first power source and a second connector to receive communications from an outside source.

The second power source may be a battery mounted to the frame and operatively connected to each of the tools to provide the second amount of power to each of the tools.

Each of the tools may be identical.

Each of the tools may be a spindle.

The various aspects of the various embodiments may be used alone or in any combination, as is desired.

DETAILED DESCRIPTION

The present application is directed to devices and methods for providing power to tools. The tools may be part of a tool cluster that is configured to be attached to a robotic device during use and to receive power through the robotic device. The application is directed to providing power to the tools when the tools and tool cluster are detached from the robotic device. The alternate power source may be an energy storage device that is attached to a tool frame of the tool cluster. The power provides for the tools to be maintained in a ready state which expedites and/or eliminates the self-diagnostic process when the tools and the tool cluster are subsequently reattached to the robotic device. This reduces the time necessary for the tools to be used in the assembly process thereby increasing the efficiency of the tooling system.

Figure 1:
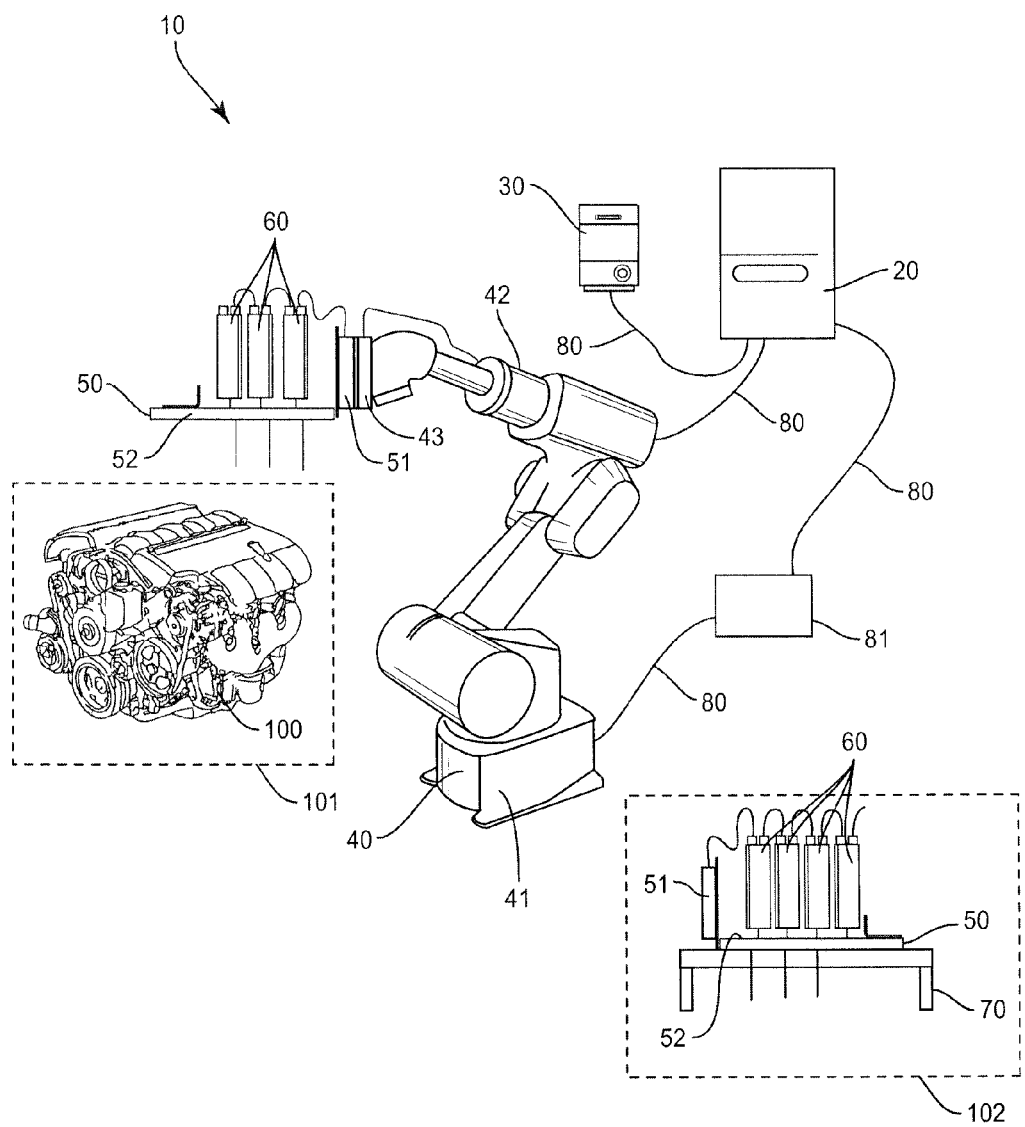
FIG. 1 is a schematic diagram of a tooling system configured to perform operations on a work piece.

FIG. 1 illustrates the components of a tooling system 10 used for performing one or more operations on a work piece 100 positioned in a work area 101. The system 10 includes a system controller 20 that controls and oversees the operation of the system 10. A tool controller 30 controls the operation of the one or more tools. A robotic device 40 is configured to position the tools 60 that each performs an operation on the work piece 100. The tools 60 are grouped together in a tool cluster 50 that includes a plurality of tools 60 mounted together on a frame 52. The tool cluster 50 is configured to be attachable to the robotic device 40 when the tools 60 are in use, and detachable when not in use. A docking station 70 maintains the tool cluster 50 when detached from the robotic device 40.

The system controller 20 controls the overall operation of the system 10. The controller 20 is typically housed in a cabinet or the like at some distance from the robotic device 40. The system controller 20 may include a control circuit with one or more processors and/or microcontrollers that controls the overall operation according to program instructions stored in memory. Various types of memory may be included for storing program instructions and data needed for operation, and other memory for storing temporary data required to carry out its operations. The system controller 20 may also include a user interface that may include one or more user input devices such as a keypad, touchpad, function keys, scroll wheel, or other type of computer input device. A display may also be included, such as a conventional liquid crystal display (LCD) or touch screen display which also functions as a user input device.

The tool controller 30 controls and monitors the operations of the tools 60. The system may include a control circuit and associated memory to act through program instructions to control the tools 60. Tool controller 30 may further include an interface and display for interaction with a user. In one embodiment as illustrated in FIG. 1, the tool controller 30 is a separate component that is in communication with the system controller 20. Other embodiments may include the functionality of the tool controller 30 performed by the system controller 20.

The robotic device 40 engages with the tool cluster 50 and moves the associated tools 60 into position in the work area 101 to perform operations on the work piece 100. The robotic device 40 is typically located proximate a work area 101, such as along an assembly line for performing operations on the various work pieces 100. The robotic device 40 may be stationary relative to the work area 101 such that the work pieces 100 move to the device 40, such as along an assembly line. Other embodiments include the robotic device 40 being movable about the work area 101. The robotic device 40 is further configured to move the tool cluster 50 and tools 60 away from the work area 101 and detach the tool cluster 50 and tools 60 thereby leaving them in a storage area 102.

In one embodiment, the robotic device 40 includes a base 41 that is either fixedly positioned or movable about the assembly area, and a movable arm 42. The robotic device 40 is configured for moving and positioning the tool clusters 50 and associated tools 60 relative to the work piece 100. The movements may include various vertical, horizontal, and rotational movements. The robotic device 40 is configured to operate according to commands received from the system controller 20. A mount 43 is positioned on the arm 42 and configured to couple to the tool cluster 50. The mount 43 is further configured to provide power and signaling commands to the attached tool cluster 50.

In one embodiment, communications between the system controller 20, tool controller 30, robotic device 40, and the tool cluster 50/tools 60 occur through a cabling system with various cables 80 extending between the components. The cables 80 are configured for carrying various data signals. In one embodiment, the system 10 communicates through a LAN. In one embodiment, communications occur through a communications bus. The cabling system may further be configured to provide power from a power source 81 to the tools 60. The power source 81 may provide a single voltage, such as 24 VDC, or a plurality of voltages such as 380 VDC and 24 VDC depending on the type and number of tools 60.

The communication between the components may also include a wireless interface, such as through a Bluetooth interface or wireless local area network (WLAN) interface. Some embodiments feature a combination of cabling and wireless communications.

Figure 2:
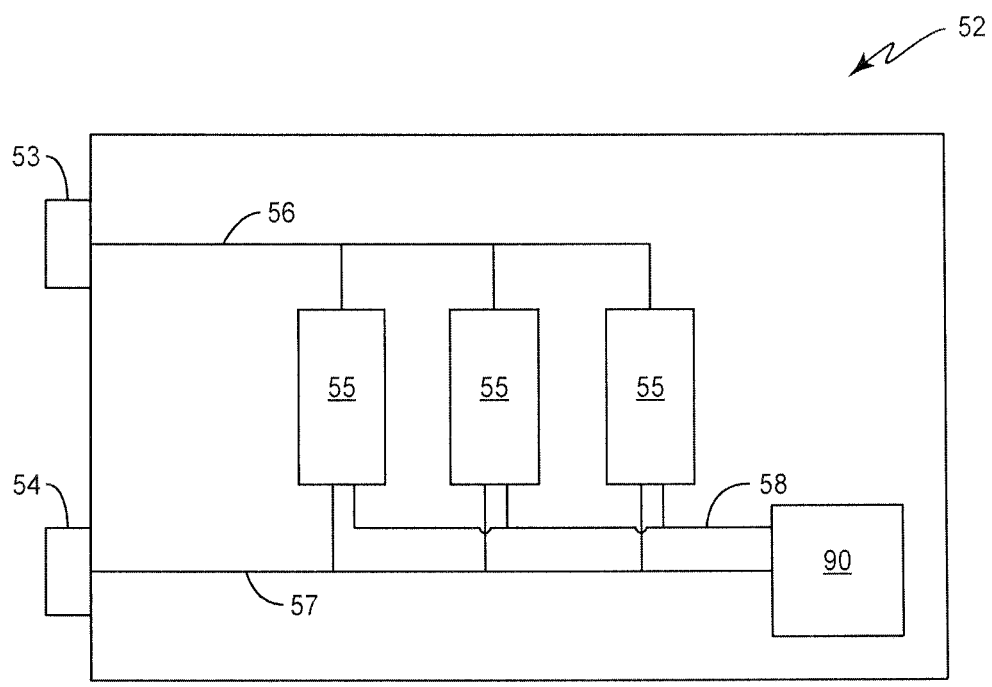
FIG. 2 is a schematic diagram of a frame that forms a section of a tool cluster.

The tool cluster 50 is configured to attach to the robotic device 40 and hold one or more tools 60. The tool cluster 50 includes a frame 52 sized and shaped to position the tools 60 for operations on the work piece 100, and to structurally attach to the robotic device 40. FIG. 2 illustrates one embodiment of a frame 52 that includes a first connection 53 for receiving and sending signals such as commands and data through the robotic device 40. A second connection 54 receives power through the robotic device 40. The frame 52 also includes mounting positions 55 each sized to receive one of the tools 60. FIG. 2 illustrates an embodiment with three mounting positions 55. Other embodiments include the frame 52 having one or more mounting positions 55. A communication line 56 extends from the connection 53 to provide signaling to each of the mounting positions 55. Likewise, a power line 57 extends from the second connection 54 to provide power to each of the mounting positions 55.

In one embodiment, an alternate power source 90 provides power to the mounting positions 55 when the frame 52 is detached from the robotic device 40. The source 90 may be attached to the power line 57 to be charged when the frame 52 is attached to the robotic device 40. A power line 58 extends from the source 90 to each of the mounting positions 55 for attachment with the mounted tools 60.

In another embodiment, the tools 60 are daisy-chained together. The signaling and power connections extend to one of the mounting positions 55 for connection with a tool 60 mounted at the location. Connections are then provided between that tool 60 and a subsequent tool 60 that is also mounted on the frame 52 at a different mounting position 55. Each of the tools 60 mounted to the frame 52 is chained together in a similar manner for power and signaling.

The tools 60 are configured to be attached to the frame 52 at the mounting positions 55. The tools 60 are electrically powered and may take any form known in the art such as screw spindles (or more generically tightening spindles) to tighten screws and nuts, welders, and others. The tools 60 are configured to be mounted on the frame 52 and to receive power and signaling through the robotic device 40 when attached. The tools 60 are further configured to receive power from the alternate power source 90 when the frame 52 is detached from the robotic device 40. In one specific embodiment, this voltage maintains the tools 60 in a ready state when not in use and prevents an initialization process for the tools 60 when reattached to the robotic device 40. Each of the tools 60 in a tool cluster 50 may be the same. Alternatively, the tool cluster 50 may include two or more different types of tools 60.

Figure 3:
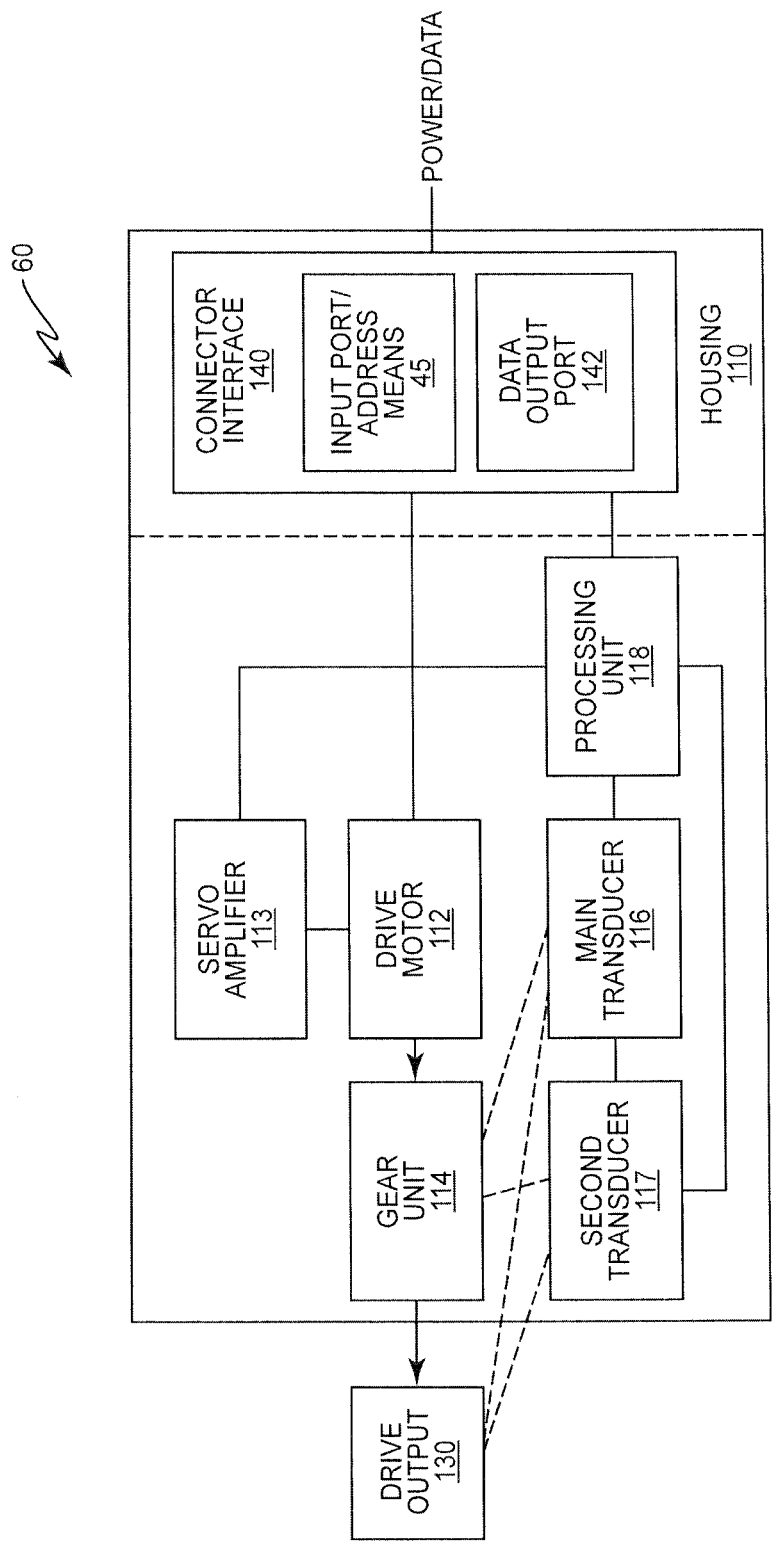
FIG. 3 is a schematic diagram of a tool that forms a section of a tool cluster.

In one embodiment, the tools 60 are electrically powered tightening spindles. The spindles 60 may include a variety of different elements and configurations. One embodiment of a spindle 60 is illustrated in FIG. 3 that includes a housing 110 and a drive output 130. The housing 110 houses a drive motor 112, a gear unit 114, a measurement transducer 116, and a processing unit 118. The drive motor 112 is electrically powered and produces rotational force in a conventional fashion. The drive motor 112 typically has a servo amplifier 113 associated therewith to aid in controlling the drive motor 112. The gear unit 114 helps couple the rotational force from the drive motor 112 to the drive output 130 in a fashion well known in the art.

The measurement transducer 116 is operative to monitor the drive motor 112, the gear unit 114, and/or the drive output 130. The measurement transducer 116 may be analog or digital, and may be removably connected to appropriate electronics, such as the processing unit 118, using one or more electrical connectors. The measurement transducer 116 may be configured to measure one or more parameters such as rotated angle, applied torque, or first derivatives of either of these parameters with respect to time. The spindle 100 may optionally include a second transducer 117 to provide redundancy, if desired.

The processing unit 118 receives measurement data from the measurement transducer 116 (or transducers 116,117) and processes the data and then supplies some or all of the processed data to an interface 140 with other upstream electronics, specifically an output data port 142 which connects with the communication bus 56. The processing unit 118 may advantageously be modular or otherwise removably mated to the balance of the spindle 60 via one or more suitable electrical connectors.

The spindle 60 further advantageously includes an address device 45, for example in the form of rotary switches to allow the spindle 60 to recognize signals from the system controller 20 or tool controller 30 that are intended for it, and vice versa. This address device 45 may form part of the interface 140.

The housing 110 substantially encloses the drive motor 112 with associated servo amplifier 113, gear unit 114, measurement transducer 116, and processing unit 118. The housing 110 also provides a suitable location for the connector interface 140 for the supply of power and the transfer of data. The connector interface 140 may conceptually include one or more input ports and one or more output ports. At least one of the output ports functions as the output data port 142 that receives processed data from the processing unit 118. The housing 110 may have multiple subcomponents, such as removable lid or shell portions, but is secured together when fully assembled so as to be handled as an integrated unit.

The connector interface 140 is further configured to engage with the tool cluster 50 to receive power and signaling through the lines 56, 57, 58. In one embodiment, each of the different tools 60 in the tool cluster 50 is configured to connect directly to the lines 56, 57, 58. In another embodiment, a first tool 60 attaches to the lines 56, 57, 58 with one or more other tools 60 connecting thereto in a daisy-chain fashion. Such a daisy-chain may be open ended or close ended (e.g., a ring). The chain may terminate in a simple termination plug, or in an over-voltage protection device if desired. The termination plug may be removed from one tool and added to another when adding or deleting tools 60 to the daisy-chain.

Embodiments of a spindle and a processing assembly are disclosed in U.S. Pat. No. 7,090,031 which is herein incorporated by reference in its entirety. Another embodiment of a spindle is the CLECO LIVEWIRE tools available from Apex Tool Group.

A docking station 70 is positioned in a storage area 102 away from the work area 101. The docking station 70 maintains the tool cluster 50 and tools 60 when detached from the robotic device 40. The docking station 70 may include a stand or other like structure for placement of the tool clusters 50 to safely position the tools 60 in preparation for reattachment and use with the robotic device 40.

When attached to the robotic device 40 and in use, the tools 60 in the tool cluster 50 receive their power and command signaling through the connection with the robotic device 40. The power and signaling provide for operation of the tools 60 to perform the applicable tasks on the work piece 100. When not in use, the tool cluster 50 and tools 60 are moved to the storage area 102, placed on the docking station 70, and detached from the robotic device 40. In one embodiment, detachment occurs upon the completion of a particular assembly sequence on the work piece 100 with a first set of tools 60 in a first tool cluster 50. The robotic device 40 then detaches the first tool cluster 50, and attaches to a second tool cluster 50 with a second set of tools 60 for additional steps of the assembly sequence.

In one embodiment, the tools 60 complete their signaling and power requirements prior to detachment from the robotic device 40. This may include various signaling protocols including but not limited to collecting and sending tool data collected by the processing unit 118, and receiving relevant signaling from the system controller 20 and/or tool controller 30.

The tools 60 may also perform a self-check on one or more of the components to check for whether the components are operating properly. In one embodiment, the tools 60 confirm that one or more of the drive motor 112, servo amplifier 113, main transducer 116, second transducer 117, and processor 118 are operating properly. The self-check may determine whether the components are operating within predetermined criteria. This criteria may be stored locally at the tool 60, or may be stored at one or more of the controllers 20, 30. If the tool is operating within the predetermined criteria, the tool is determined to be operationally ready for future use. If it is operating outside of the criteria, the tool 60 may be identified for service and/or replacement.

The tools 60 may further place one or more of the components (e.g., servo amplifier 113, transducers 116, 117, gear unit 114 and drive output 130) at a particular state for re-use during the next cycle of use when attached to the robotic device 40.

The robotic device 40 provides a high-voltage power source to the various tools 60 on the tool cluster 50. At detachment, power is supplied to the tools 60 by the alternate power source 90. The alternate power source 90 provides a lesser voltage to the various tools 60 on the tool cluster 50. This lesser voltage provides for the tools 60 to remain in a ready state for when the tool cluster 50 is used again by the robotic device 40. In one embodiment, the energy storage device 90 provides a voltage of 24V.

The system is configured for a smooth, seamless power transition from the robotic device 40 to the alternate power source 90. This prevents any power fluctuations or bumps with the power supplied to the tools 60 which could result in the tools 60 processing through a re-initialization process when subsequently reattached with the robotic device 40. The re-initialization process may include a self-check to determine whether one or more of the components are operating properly. The self-check is a relatively timely operation.

The power supplied to the tools 60 when detached from the robotic device 40 is adequate for the tools 60 to remain in a ready state of use for when the tool cluster 50 is reattached to the robotic device 40. This prevents the tools 60 from being re-initialized after reattachment with the robotic device 40. This provides for quicker transitions for the tooling system 10 when changing between different tooling clusters 50. The power supplied from the source 90 maintains the one or more of the components such that a functional test is not necessary at the time the tool cluster 50 is reattached to the robotic device 40. The functional test determines that one or more of the components in the tool 60 is properly functioning. The one or more components are maintained at a functional level such that the testing performed prior to detachment is still valid. This prevents the tools 60 from having to perform a functional test when the tool cluster 50 is reattached to the robotic device 40. Various components may be powered to maintain their functional capacity, such as but not limited to the main transducer 116, second transducer 117, and processing unit 118. In a specific embodiment, a tool memory ID chip in the transducer 116 is maintained in an operational state by the alternate power source 90. In another embodiment, a measuring card in the servo amplifier 113 is maintained in an operational state.

Previous systems have included power being stopped when the tool clusters 50 were parked at the docking station 70. This resulted in the tools 60 going through the functional re-initialization process at the time of reattachment with the tools 60 being incapable of use until the completion of the process. The re-initialization process includes each tool proceeding through a functional test to ensure that one or more of the components are operational and the tool is ready for use on a work piece. In one embodiment, the process is performed serially with a first tool being initialized, followed by a second tool, third tool, etc. This is a time-consuming process that slows the overall efficiency of the system.

The power supplied by the energy storage device 90 maintains the tools 60 in the ready-state. In one embodiment, the power is not adequate to operate the tools 60. In one embodiment, the alternate source 90 provides 24 VDC power to the tools 60. A variety of different sources 90 may be used to provide the necessary power.

In one embodiment, the device 90 includes one or more rechargeable batteries to provide power to the tools 60. The one or more batteries each include one or more electrochemical cells, and may include a variety of different combinations of chemicals, including but not limited to lead-acid, nickel cadmium, nickel metal hydride, lithium ion, and lithium ion polymer. The rechargeable batteries are sized to be mounted on the frame 52 and as such are moved with the tool cluster 50 when attached to the robotic device 40.

In another embodiment, the source 90 is provided through one or more supercapacitors. The supercapacitors may include a variety of different types and constructions. The supercapacitors may be configured for electrostatic storage of electrical energy, such as a double-layer capacitor. Another configuration provides for electrochemical storage of electrical energy, such as with a pseudocapacitor. Other configurations include hybrid capacitors with both significant double-layer capacitance and pseudocapacitance.

For both the rechargeable battery and the supercapacitor, the one or more sources 90 may be charged through the power line 57 during attachment with the robotic device 40. After detachment, the one or more sources 90 provide power to the tools 60 through the power line 58.

Figure 4:
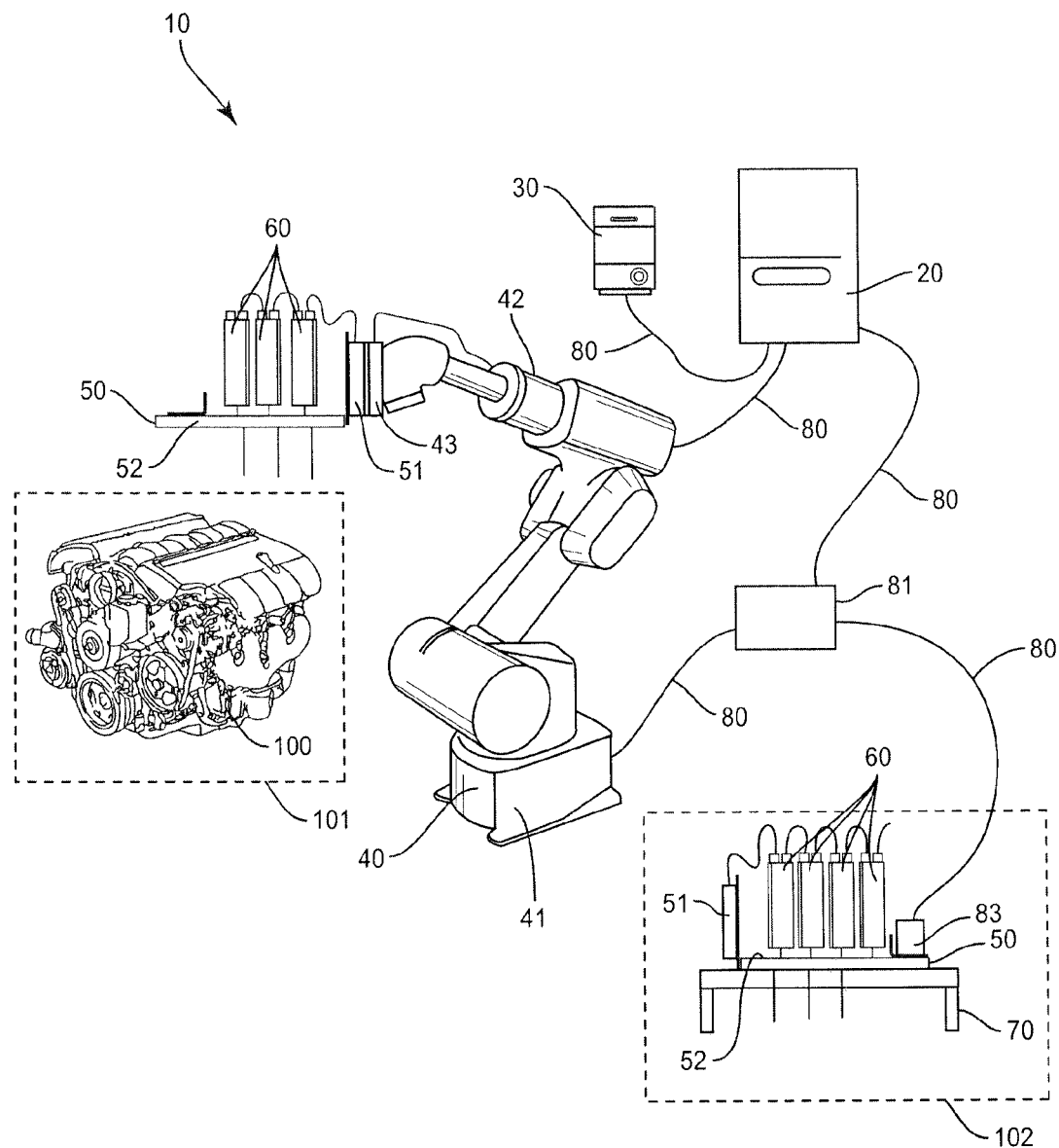
FIG. 4 is a schematic diagram of a power source attached to a docked tool cluster.

FIG. 4 illustrates another embodiment of an alternate power source configured for providing power to a docked tool cluster 50. Power from the alternate power source 81 is provided through a cable 80 to the docked tool cluster 50. In this embodiment, the frame 52 may be configured to connect with the cable 80, such as through the connector 54. Alternatively, the frame 52 may include a separate connector 83 that connects to the cable 80. The cable 80 is configured such that a connection is enabled when the tool cluster 50 is placed and detached at the docking station 70.

In one embodiment with the power being supplied from the alternate power source 81, the power is supplied directly to the mounted tools 60 such that the frame 52 does not include an energy storage device 90. In another embodiment, the frame 52 includes an energy storage device 90 which is charged by the power source 81. Power from the alternate source 81 charges the device 90 which supplies the necessary power to the tools 60.

The various embodiments for supplying power to the tools 60 when the tool cluster 50 is docked may be used individually or in various combinations. Further, multiple different power sources may be used. Each alternate source may provide power to one or more different tools 60. In one embodiment, a separate power source is provided for each tool 60. These power sources may be associated with the frame 52 of the tool cluster 50, or may be associated with the specific tool 60 which they supply power.

Figure 5:
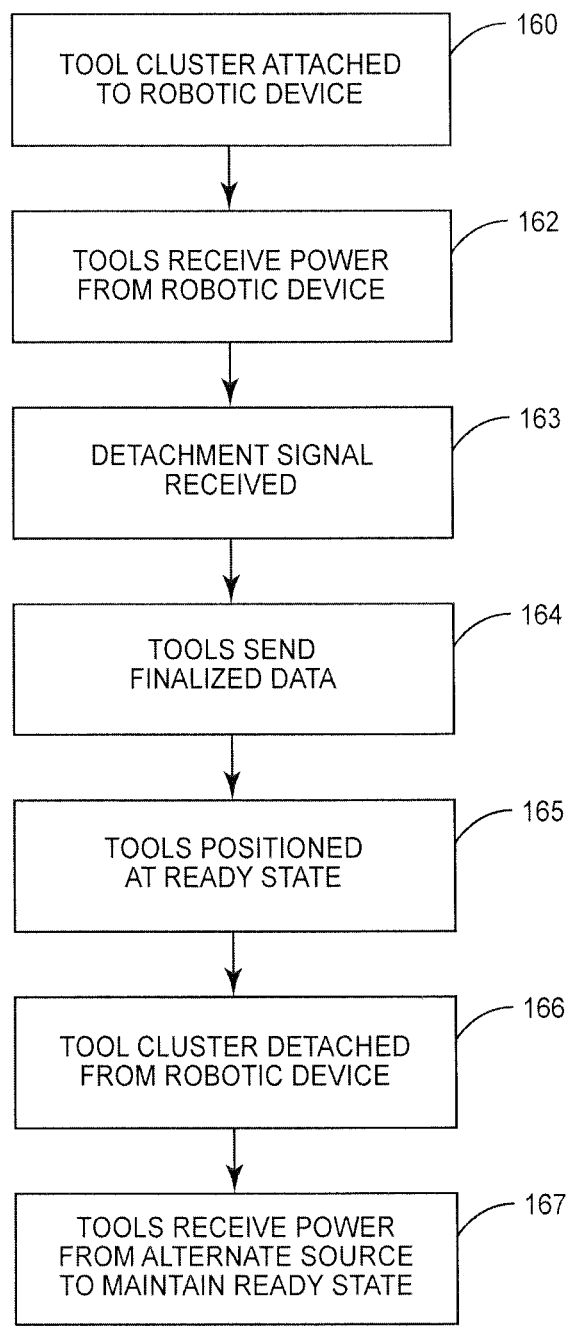
FIG. 5 is a flowchart diagram of a method of providing power to tools when the tool cluster is detached from a robotic device.

The tooling system 10 may be used in a variety of different methods. FIG. 5 illustrates one method. Initially, the tool cluster 50 is attached to the robotic device (step 160) and the tools 60 receive power through the robotic device (step 162). While still attached, a detachment signal is received by the tools 60 (step 163). The signal may be sent from the system controller 20 and/or the tool controller 30. In one embodiment, this signal is received after the tools 60 have completed operations on the work piece 100.

As a result of the signal and while still attached to the robotic device 40, the tools 60 prepare for detachment from the robotic device 40. This may include sending final tool data to the system controller 20 and/or tool controller 30 (step 164). In an embodiment with the tools 60 being spindles, the data may include but is not limited to rotated angle, applied torque, or first derivatives of either of these parameters with respect to time from one or both transducers 116, 117. Data may also include drive motor 112 and gear unit information processed by the processing unit 118. The tools 60 may also be oriented at a predetermined position in preparation for a subsequent use. In one embodiment, this may include the drive output 130 being run out to a predetermined orientation. This may also include a functionality test on one or more of the components. The results of the test are then sent to one or more of the controllers 20, 30. Prior to detachment, the tools 60 are in the ready state in preparation for subsequent reuse.

During the time that the tools 60 are preparing for detachment, the robotic device 40 is physically moving the tool cluster 50 away from the work piece 100 at the work area 101 and to the docking station 70 at the storage area 102. Preferably, the tools 60 are in the ready state at the time the tool cluster 60 reaches the docking station 70 as this prevents the robotic tool 40 from having to wait for completion prior to detachment. In one embodiment, the tools 60 send a signal to the system controller 20 and/or tool controller 30 when they have achieved a ready state and can be detached from the robotic device 40.

The robotic device 40 detaches the tool cluster 50 at the docking station 70 (step 166). At detachment, the tools 60 no longer receive power through the robotic device 40. Instead, the tools 60 receive power from an alternate energy source (step 167), such as the energy storage device 90 or the power source 81. The transition to the new power source is seamless to prevent any power fluctuations or any period without power to the tools 60. The seamless transition prevents the tools 60 from shutting down and thereby having to go through the re-initialization process when subsequently reattached to the robotic device 40.

In one embodiment, the amount of power received from the alternative source is less than that received through the robotic device 40. In one embodiment, the power source is adequate to main one or more components of the tools 60 in an active state. In one embodiment with the tools 60 being spindles, the power source provides power to maintain the integrity of the servo amplifier 113, one or more of the transducers 116, 117, and the processing unit 118. In one embodiment, the power is adequate for the tools 60 to maintain their configuration and communications settings. In one embodiment, the tools 60 of the tool cluster 50 receive no signaling from the system 10 while parked at the docking station.

The power is maintained to the tool cluster 50 during the time it is parked at the docking station 70. At a subsequent time, the robotic device 40 moves back to the docking station 70 and re-attaches with the tool cluster 50. Because the tools 60 were maintained in the ready state, the tools 60 do not go through the initialization process that includes the functionality self-check which would delay the time before they are available for operation on the work piece 100. This results in less down time of the tool cluster 50 and robotic device 40 and increases the efficiency of the tooling system 10.

In one embodiment, the tools 60 go through a signaling configuration when initially reattached with the robotic device 40. The signaling configuration may include a verification of one or more aspects of the tool (e.g., type of tool, tool ID), and a verification that the signal from one or more of the controllers 20, 30 was received. However, the signaling configuration consumes less time than necessary for the initiation process.

Figure 6:
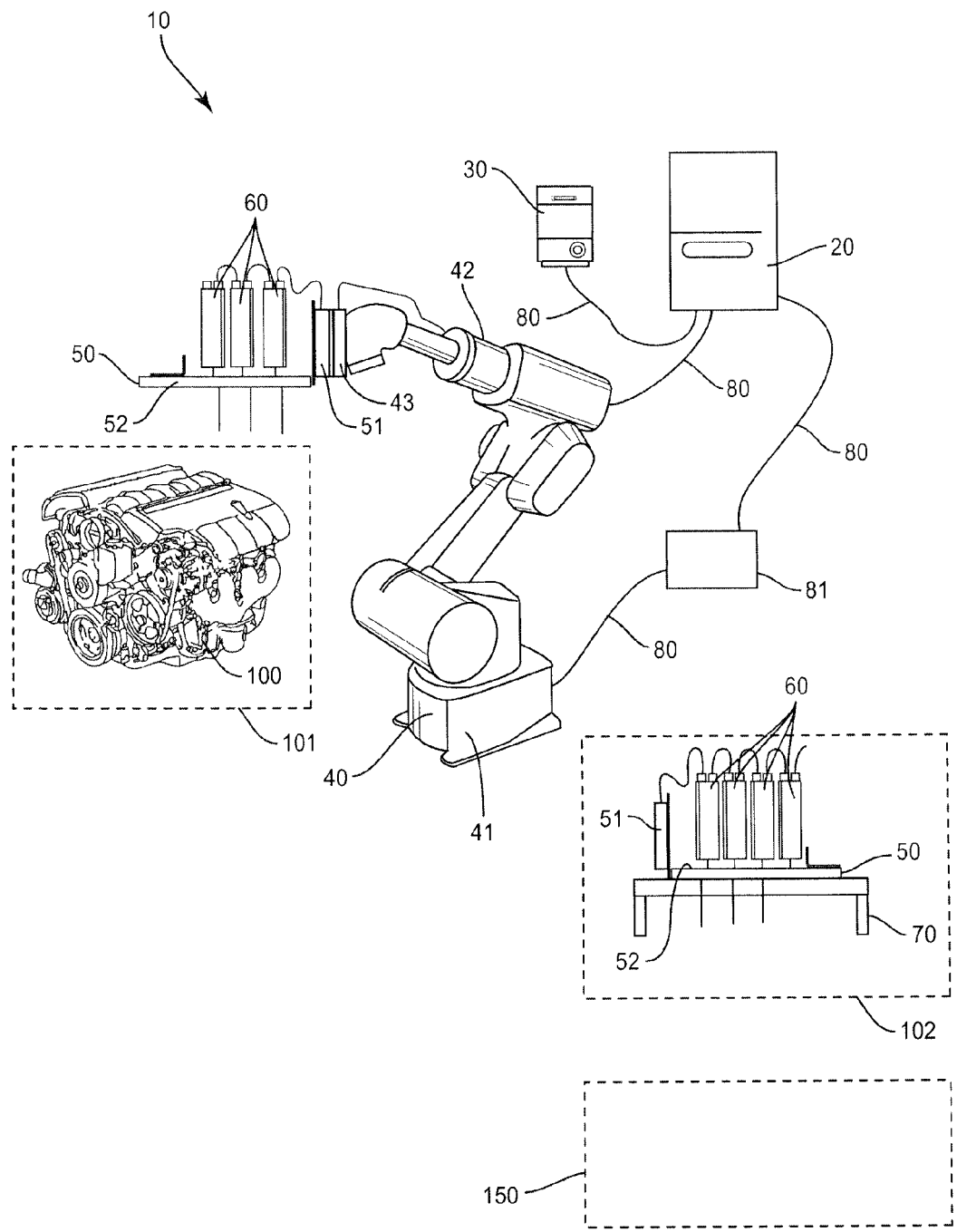
FIG. 6 is a schematic diagram of a tooling system that includes a maintenance area.

In one embodiment as illustrated in FIG. 6, a maintenance area 150 is positioned in proximity to the robotic device 40. The robotic device 40 is configured to deliver the tool cluster 50 to this area and detach the cluster 50. This area provides for maintenance to occur on one or more of the components of the tool cluster 50.

In one embodiment, a tool cluster 50 is delivered to the maintenance area 150 upon the detection of a problem. The problem may include an indication from one or more of the controllers 20, 30 or the tool itself that one or more of the tools 60 are not properly operating. This notification may be obtained through the various testing and performance protocols of one or more of the system controller 20 and the tool controller 30. Examples of problems may include but are not limited to a tool 60 operating at a speed slower than expected, a non-operational tool, or a tool 60 that is not receiving power through the daisy-chain connections. The tool cluster 50 may be repaired or replaced as necessary with a functioning component. This area 150 may also be used for normal maintenance work that is periodically performed on the tool clusters 50.

In one embodiment, power is removed from the one or more tools 60 when delivered to this area 150. This ensures that the tools 60 are non-operational and that work can be performed on the tools 60 without the chance of tool operations that could cause an injury to a technician.

In one embodiment, the tooling system 10 includes redundant tool clusters 50. A first one of the tool clusters 50 may be delivered to the maintenance area 150 and taken off-line from the system 10. Concurrently, a second redundant tool cluster 50 is available in the system for attachment to the robotic device 40 and to perform operations. This redundancy enables the system 10 to remain active while one or more of the tool clusters 50 are unavailable.

In one embodiment, the tool clusters 50 include a single tool 60 that is attachable to the robotic device 40. The tool 60 may attach directly to the robotic device 40 through one or more connections, or the tool 60 may be attached to a frame that is attached to the robotic device 40. The tool 60 receives power through the robotic device 40 at the time of attachment. The tool 60 is further detachable from the robotic device 40 and receives power from an alternate power source.

Prior to be detached from the robotic device 40, one or more of the tools 60 may be moved to a ready state in preparation for detachment. This movement is performed while the tools 60 are being powered through the robotic device 40. This movement may include one or more tools 60 being moved to a retracted or home position in which the tool is in closer proximity to the robotic device 50 and/or frame 52. This "pounce position" may facilitate detachment from the robotic device 50 and/or decrease the amount of time necessary for the tool 60 to be ready for use when subsequently reattached to the robotic device 40.

Figure 7:
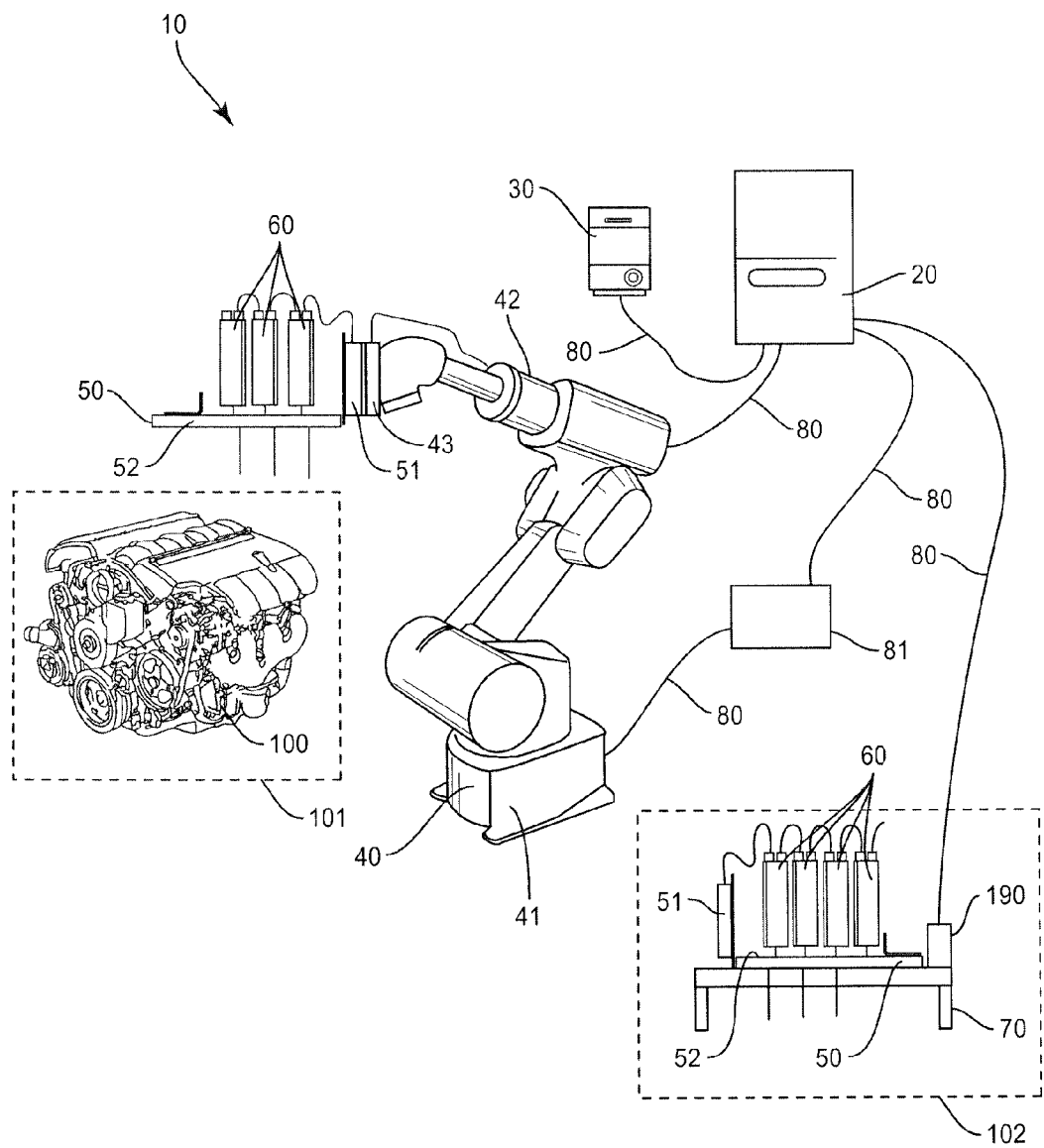
FIG. 7 is a schematic diagram of a tooling system configured to perform operations on a work piece.

The tooling system 10 may also include a controller 190 configured for operations when the tool cluster 50 is in the storage area 102 as illustrated in FIG. 7. The tool controller 190 may include a control circuit and associated memory to act through program instructions to control the tools 60. Tool controller 190 may further include an interface and display for interaction with a user. Communications between the tool controller 190 and system controller 20 occur through a cabling system with various cables 80 extending between the components. The cables 80 are configured for carrying various data signals. The communication between the components may also include a wireless interface, such as through a Bluetooth interface or wireless local area network (WLAN) interface. Some embodiments feature a combination of cabling and wireless communications.

When the tool cluster 50 is docked at the storage area 102, the controller 190 may perform a check on one or more of the components to check for whether the components are operating properly. In one embodiment, each of the one or more tools 60 confirm that one or more of the drive motor 112, servo amplifier 113, main transducer 116, second transducer 117, and processor 118 are operating properly. This may include a check to determine whether the components are operating within predetermined criteria. This criteria may be stored locally at the tool 60, or may be stored at one or more of the controllers 190, 20, 30. If the tool is operating within the predetermined criteria, the tool is determined to be operationally ready for future use. If it is operating outside of the criteria, the tool controller 190 may identified the tool 60 for service and/or replacement. The tool controller 190 may further place one or more of the components (e.g., servo amplifier 113, transducers 116, 117, gear unit 114 and drive output 130) at a particular state for re-use during the next cycle of use when attached to the robotic device 40.

The functional tests performed by the tool controller 190 may be the same as those performed while the tool cluster 50 is attached to the robotic device 40. The functional tests may also be different. In one embodiment, these functional tests are more thorough and require a greater amount of time to complete than those performed during attachment with the robotic device 40.

In one embodiment as illustrated in FIG. 7, the tool controller 190 is a separate component that controls the tool clusters 60 when parked at the storage areas 102. Other embodiments may one or both of the tool controller 30 and the system controller 20 performing the operations of the tools 60 when parked in this area 150.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method providing power to one or more tools during a manufacturing process, the method comprising:
    attaching a tool cluster to a robotic device and providing power through the robotic device to each of a plurality of tools on the tool cluster;

performing operations with the tools while the tool cluster is attached to and powered through the robotic device;

performing a functional test on the tools of the tool cluster while the tool cluster is attached to the robotic device and after performing the operations, the functional test determining whether the tool is operating according to predetermined criteria;

detaching the tool cluster from the robotic device;

providing power to the tools through an alternate power source separate from the robotic device while the tool cluster is detached from the robotic device, the power source providing a lesser amount of voltage to the tools than the robotic device, the lesser amount of voltage being adequate to maintain the tools in a functional ready state;

reattaching the tool cluster to the robotic device and again providing power to the tools through the robotic device; and performing operations with the tools without again performing the functional test on the tools.

2. The method of claim 1, further comprising recharging the alternate power source through the robotic device while the tool cluster is attached to the robotic device.

3. The method of claim 1, further comprising performing a functional test on the tools of the tool cluster while the tool cluster is detached from the robotic device, the functional test determining whether the tool is operating according to the predetermined criteria.

4. The method of claim 1, further comprising receiving a signal to detach the tool cluster from the robotic device prior to performing the functional test on the tools.

5. The method of claim 1, further comprising maintaining a processor in each of the tools active when the tool cluster is detached from the robotic device.

6. The method of claim 1, further comprising performing a tool verification and a signal verification procedure upon reattaching the tool cluster to the robotic device, each of the tool verification and the signal verification taking less time to complete than the functional test.

7. The method of claim 1, further comprising performing the functional test on each of the tools while the robotic device is moving the tool cluster towards a docking station.

8. The method of claim 1, wherein the alternate power source is a plurality of separate devices that each supply power to one or more of the tools.

9. The method of claim 1, further comprising providing power from the robotic device to a single one of the plurality of tools, and providing power to a remainder of the plurality of tools in a daisy-chain manner.

10. The method of claim 1, further comprising moving at least one of the tools from a working position to a retracted position in closer proximity to the robotic device while the tools are receiving power through the robotic device and prior to detaching the tool cluster from the robotic device.

11. A method of providing power to one or more tools during a manufacturing process, the method comprising:

receiving power at a tool from the robotic device while the tool is attached to the robotic device;

performing an operation with the tool while the tool is being powered through the robotic device;

receiving a signal indicating a detachment and determining that the tool is in an operational condition;

detaching the tool from the robotic device and receiving power at the tool from an alternate power source, the amount of power received from the alternate power source being less than through the robotic device;

reattaching the tool to the robotic device with the tool again receiving power through the robotic device; and performing operations with the tool while reattached to the robotic device without determining that the tool is in the operational condition.

12. The method of claim 11, further comprising performing a functional test on the tool while the tool cluster is detached from the robotic device, the functional test determining whether the tool is operating according to a predetermined criteria.

13. The method of claim 11, further comprising moving the tool from a working position to a retracted position in closer proximity to the robotic device after receiving the signal indicating the detachment, while the tool is receiving power through the robotic device, and prior to detaching the tool from the robotic device.

14. The method of claim 11, further comprising recharging the alternate power source through the robotic device while the tool is attached to the robotic device.

15. The method of claim 11, further comprising maintaining a processor in the tool active when the tool is detached from the robotic device.

16. The method of claim 11, further comprising performing a tool verification and a signal verification procedure upon reattaching the tool to the robotic device.

17. The method of claim 11, further comprising performing the functional test on the tool while the robotic device is moving the tool towards a docking station.

18. The method of claim 11, wherein the tool is mounted on a tool cluster, with the tool cluster being configured to be attached and detached to the robotic device.

19. The method of claim 18, further comprising supplying power to a second tool on the tool cluster through the robotic device when the tool cluster is attached to the robotic device and through the alternate power source when the tool cluster is detached from the power source.

20. The method of claim 19, wherein the alternate power source is a plurality of separate devices that each supply power to one or both of the tools.

21. The method of claim 11, further comprising receiving communications from the robotic device when the tool is attached to the robotic device.

22. A tooling system comprising:

a frame configured to be removably attachable to a robotic device;

a plurality of tools mounted to the frame and configured to perform an operation on a work piece, the tools each including a processor;

each of the tools configured to receive a first amount of power from a first power source when the frame is attached to a robotic device, the first power source providing power for the tools to perform operations on a first work piece, and to receive a lesser second amount of power from a second power source when the frame is detached from the robotic device;

the processors configured to perform a functional test on the tool after the operation on the work piece is complete and while receiving the first amount of power from the first power source, the functional test determining that the tool is operating according to a predetermined criteria;

the processors configured to remain active and maintain the functional test while receiving the second lesser amount of power from the second power source;

the processors configured to perform the operation on a second work piece without performing the functional test on the tool when again receiving the first amount of power from the first power source.

23. The tooling system of claim 22, wherein the processors are configured to perform a test on the tool while receiving the second lesser amount of power from the second power source with the test determining whether the tool is operating according to a predetermined criteria.

24. The tooling system of claim 22, wherein each of the plurality of tools are connected together in a daisy-chain manner with a first one of the plurality of tools configured to receive power from the first power source when the frame is attached to the robotic device and receive the second amount of power from the second power source when the frame is detached from the robotic device and a remainder of the plurality of tools connected together in the daisy-chain manner to receive the power.

25. The tooling system of claim 22, wherein the tools further include a motor with the processor configured to position the motor at a predetermined setting during the functional test.

26. The tooling system of claim 22, wherein the frame includes a first connector to receive power from the first power source and a second connector to receive communications from an outside source.

27. The tooling system of claim 22, wherein the second power source is a battery mounted to the frame and operatively connected to each of the tools to provide the second amount of power to each of the tools.

28. The tooling system of claim 22, wherein each of the tools is identical.

29. The tooling system of claim 28, wherein each of the tools is a spindle for tightening objects on the first and second work pieces.

* * * * *